US007830870B2

(12) United States Patent
Kuo et al.

(10) Patent No.: US 7,830,870 B2
(45) Date of Patent: Nov. 9, 2010

(54) ROUTER AND METHOD FOR TRANSMITTING PACKETS

(75) Inventors: Shih-Min Kuo, Hsinchu (TW); Chin-Shen Chuo, Hsinchu (TW)

(73) Assignee: Infineon Technologies Taiwan Co., Ltd., Hsinchu (TW)

(*) Notice: Subject to any disclaimer, the term of this patent is extended or adjusted under 35 U.S.C. 154(b) by 1185 days.

(21) Appl. No.: 10/652,273

(22) Filed: Aug. 29, 2003

(65) Prior Publication Data

US 2004/0136356 A1 Jul. 15, 2004

(51) Int. Cl.
H04L 12/28 (2006.01)
H04L 12/56 (2006.01)

(52) U.S. Cl. .................. 370/389; 370/392; 370/395.1; 370/395.31; 370/395.32

(58) Field of Classification Search .......... 370/392, 370/395.31, 351, 395.3, 352, 389, 395, 471, 370/474; 709/239, 242
See application file for complete search history.

(56) References Cited

U.S. PATENT DOCUMENTS

| 6,028,848 | A * | 2/2000 | Bhatia et al. ............. 370/257 |
| 6,331,984 | B1 * | 12/2001 | Luciani ................. 370/401 |
| 6,389,419 | B1 * | 5/2002 | Wong et al. ................. 707/7 |
| 6,418,476 | B1 * | 7/2002 | Luciani ................. 709/238 |
| 6,542,504 | B1 * | 4/2003 | Mahler et al. ............ 370/392 |
| 6,594,704 | B1 * | 7/2003 | Birenback et al. ......... 709/238 |
| 6,608,830 | B1 * | 8/2003 | Hirano et al. ............ 370/351 |
| 6,775,804 | B1 * | 8/2004 | Dawson ................ 714/776 |
| 7,042,876 | B1 * | 5/2006 | Jayasenan et al. ........ 370/389 |
| 7,072,981 | B1 * | 7/2006 | O'Rourke et al. ........ 709/245 |
| 7,260,649 | B1 * | 8/2007 | Somasundaram et al. ... 709/245 |
| 7,269,663 | B2 * | 9/2007 | Beier et al. ............. 709/238 |
| 7,379,475 | B2 * | 5/2008 | Minami et al. ........... 370/469 |
| 2006/0120366 | A1 * | 6/2006 | Jayasenan et al. ........ 370/389 |

* cited by examiner

Primary Examiner—Ayaz R Sheikh
Assistant Examiner—Blanche Wong
(74) Attorney, Agent, or Firm—Eschweiler & Associates, LLC (57) ABSTRACT

The router of the invention comprises a routing table and an NAT table, which comprises an internet routing field for recording an address where a routing path to a WAN is stored, an intranet routing field for recording an address where a routing path to an LAN is stored, and a routing flag field for recording information indicating whether the NAT table stores an address where a routing path to a destination address is stored. When receiving a packet to a destination address, the router checks whether the NAT table records the address where a routing path to the destination address is stored. The router transmits the packet based on the routing information of the NAT table if the result is positive. If the result is negative, the router selects a routing path to the destination address from the routing table and transmits the packet base on the selected routing path.

11 Claims, 9 Drawing Sheets

| version | Header length | Type-of-service | Total length | |
|---|---|---|---|---|
| Identification | | | Flag | Fragment offset |
| Time-to-live | | Protocol | Header checksum | |
| Source address (address of host 14) | | | | |
| Destination address (address of host 34) | | | | |
| data | | | | |

| version | Header length | Type-of-service | Total length | |
|---|---|---|---|---|
| Identification | | | Flag | Fragment offset |
| Time-to-live | | Protocol | Header checksum | |
| Source address (address of router 18) | | | | |
| Destination address (address of host 34) | | | | |
| data | | | | |

| Name of field | Type-of-data |
|---|---|
| Source address | Structure |
| Destination address | Structure |
| Router address | Structure |
| Source port | Integer |
| Destination port | Integer |
| Router port | Integer |
| Protocol type | Integer |
| Routing flag | Integer |
| Intranet routing | Structure pointer |
| Internet routing | Structure pointer |

ROUTER AND METHOD FOR TRANSMITTING PACKETS

BACKGROUND OF THE INVENTION (A) Field of the Invention

The present invention relates to a router and a method for the router to transmit packets, and more particularly, to a method with two transmission modes for the router to transmit packets.

(B) Description of the Related Art

Figure 1:
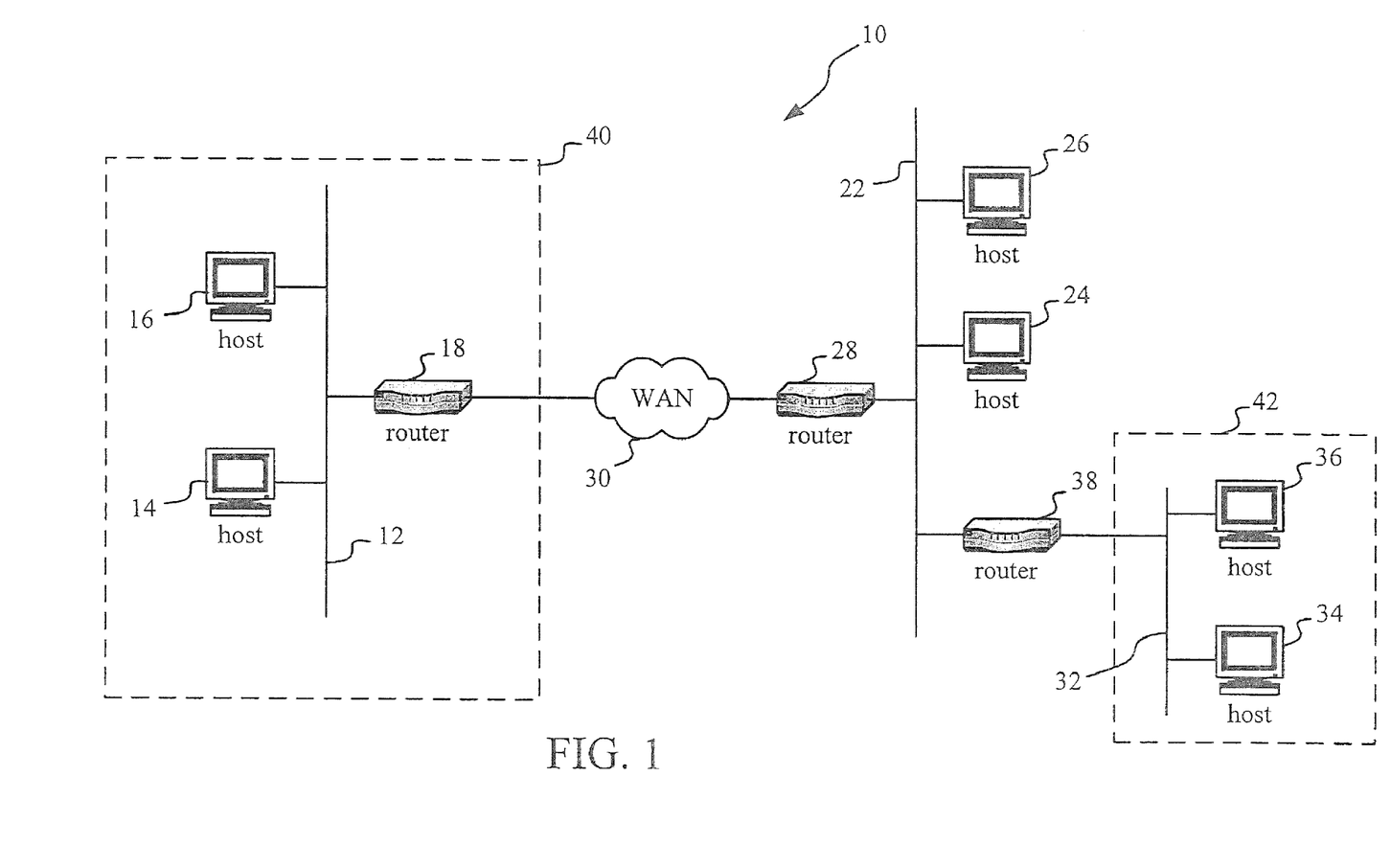
FIG. 1 is schematic diagram of an Internet according to the prior art.

The Transport Control Protocol/Internet Protocol (TCP/IP) has been widely used in today's Internet technology. A TCP/IP-based Internet provides a datagram transmitting system between network devices such as hosts, and servers connected to an Internet. FIG. 1 is a schematic diagram of an Internet 10. The Internet 10 comprises Local Area Networks (LANs) 12, 22, 32 and a Wide Area Network (WAN) 16, interconnected by routers 18, 28 and 38. The hosts 14 and 16 are located in the network domain 40, while the hosts 34 and 36 are located in another network domain 42.

Figure 2:
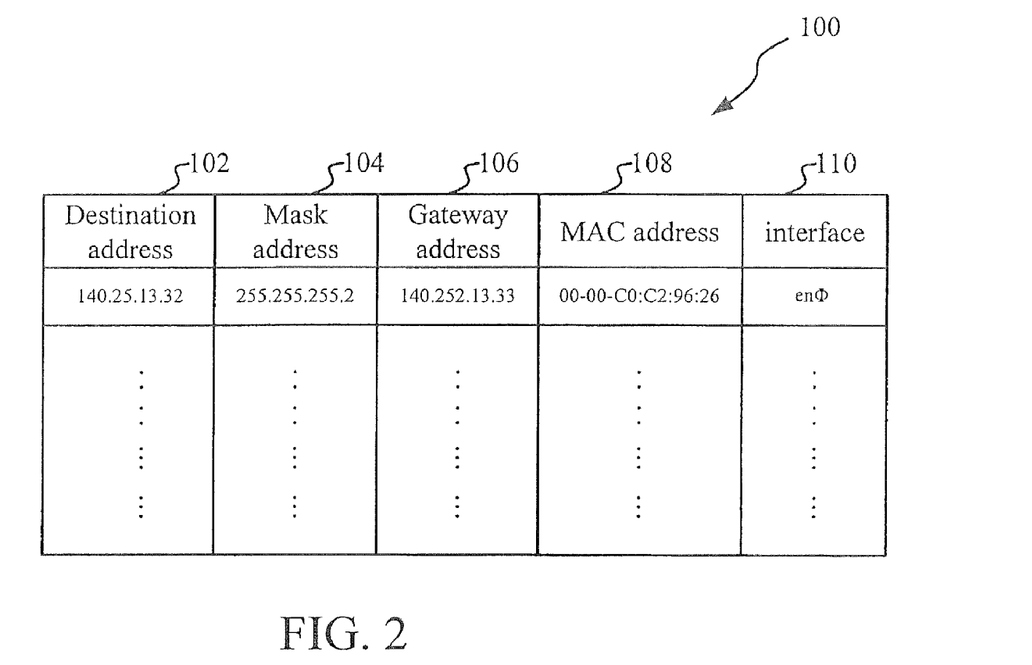
FIG. 2 is a schematic diagram of a routing table.

Routers 18, 28 and 38 each comprises an embedded routing table for recording routing paths about what networks are reachable. FIG. 2 is a schematic diagram of a routing table 100. As shown in FIG. 2, the routing table 100 comprises a destination address field 102, a mask address field 104, a gateway address field 106, an MAC address field 108 and an interface field 110. When a router receives a packet, it checks whether the network portion of the destination address in the packet is directly connected to the router. If the result is positive, the router will deliver the packet directly to the destination host. Otherwise, the router selects a routing path from its embedded routing table, and sends the packet directly to the next router through which the destination network is reachable.

Figure 3:
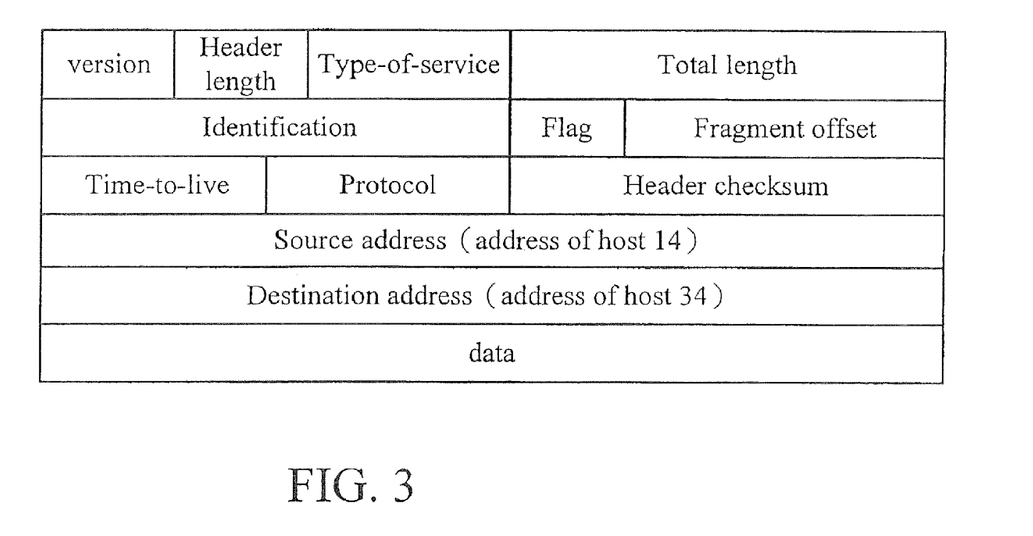
FIG. 3 is schematic diagram showing the format of an Internet packet.

FIG. 3 is a schematic diagram showing the format of an Internet network packet. As shown in FIG. 3, when a datagram is transmitted from the host 14 (a source host) to the host 34 (a destination host), the address of the host 34 is specified as the destination address of the datagram. The datagram is then enveloped with a header to form a packet and sent to the router 18 connected to the same network (LAN 12) as the source host 14. When receiving the packet, the router 18 reads the destination address from the header of the packet, selects the next router that can route to the destination host, e.g., router 28, and transmits the packet to the next router 28. This process continues until the packet reaches the network to which the destination host 34 is connected, i.e., LAN 32, wherein the router 32 connected to the LAN 32 directly delivers the packet to the destination host 34.

The Network Address Translation (NAT) is one of the solutions for running out of Internet Protocol (IP) addresses. According to the NAT technology, a private addresses is used for a datagram to be transmitted within a network domain, and the private address is translated into a public addresses only when the datagram is to be transmitted to the outside of the network domain. Since the number of hosts to be connected outside of the network domain at the same time is smaller than the total number of hosts in the network domain, the lack of IP address can be resolved by assigning the public address to the host for connecting to the outside of the network domain and withdraw the assignment when the host terminates the connection.

Figure 4:
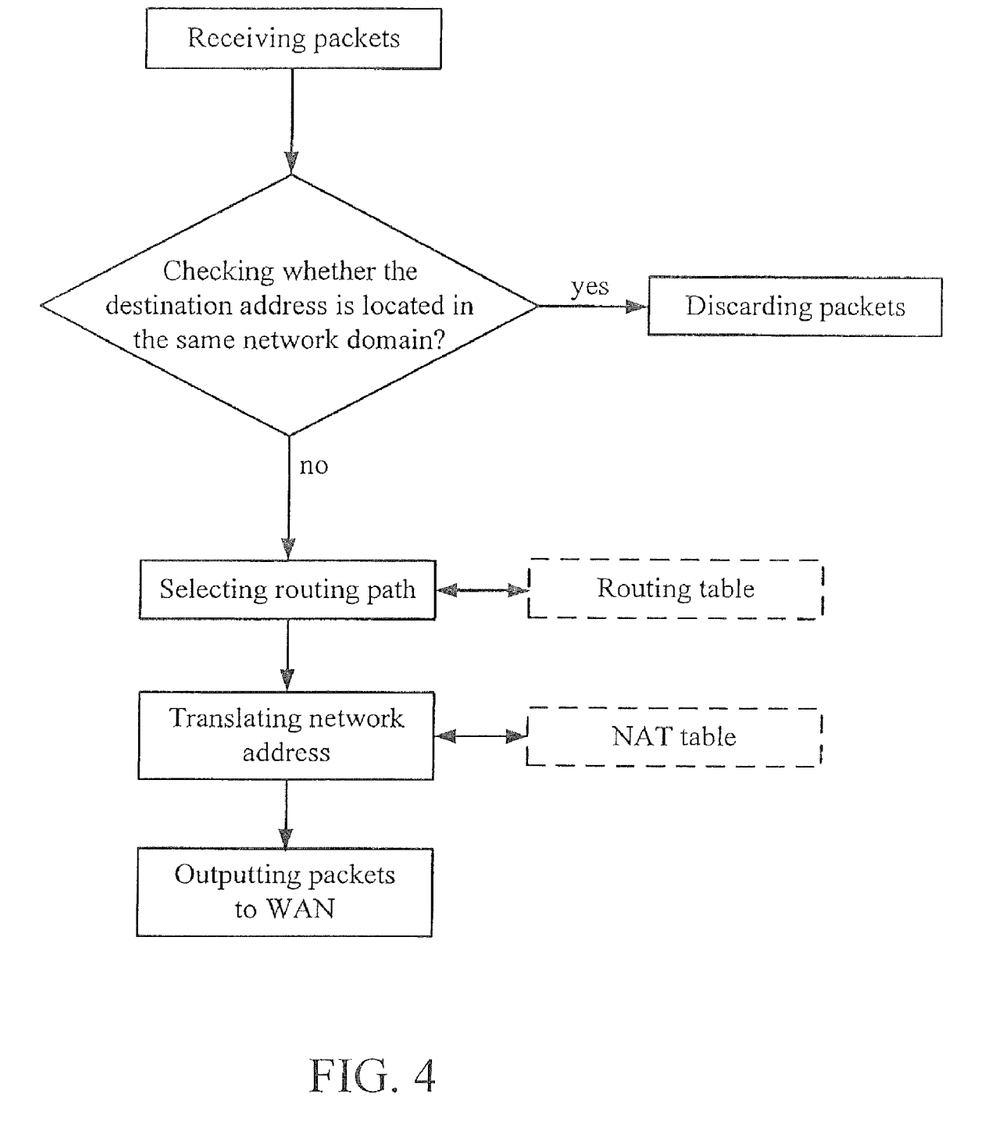
FIG. 4 is a flow chart showing the operation of a router with the NAT function according to the prior art.
Figure 5:
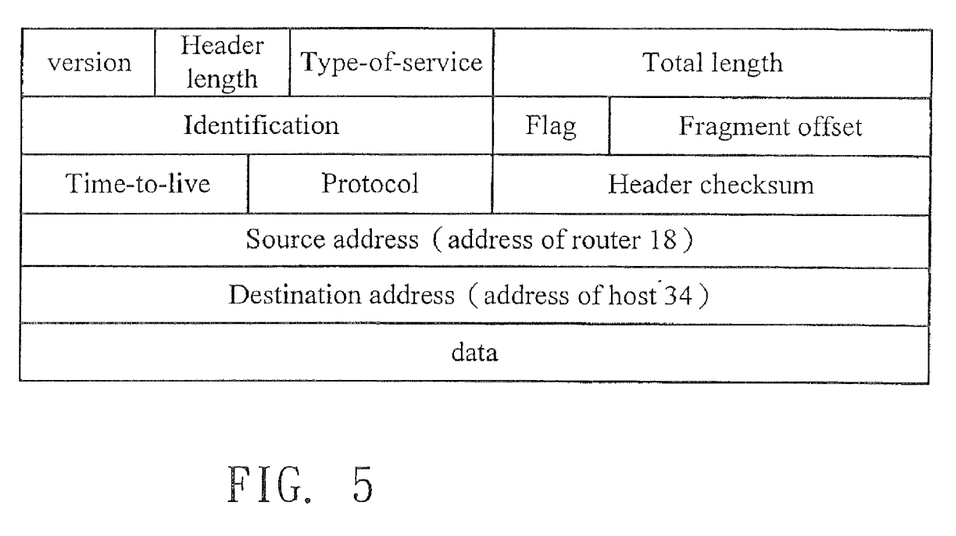
FIG. 5 is a schematic diagram showing the packet shown in FIG. 3 after network address translation according to the prior art.

FIG. 4 is a flow chart showing the operation of a router with the NAT function. Referring to FIG. 1, according to the NAT solution, the host 14 specifies its private address as the source address and the address of the host 34 as the destination address when transmitting a datagram to the host 34 via router 18. When receiving the packet from the host 14, the router 18 checks whether the destination address of the packet is within the network domain 40. If the result is positive, it is not necessary to transmit the packet outwardly and the router 18 will discard the packet. If the checking result is negative, the router 18 selects a routing path to the destination address from the routing table and replaces the private address of host 14 recorded in the source address field of the packet with the public address of the router 18, as shown in FIG. 5. The router 18 recalculates the header checksum and forwards the packet to the next router via WAN 30. Ultimately, router 38 receives the packet and delivers the packet to host 34.

In the above-mentioned operation procedure, selecting a routing path to a destination host from the routing table is the most time-consuming for a router between receiving the packet from the LAN and transmitting the packet to the WAN. Besides, all packets transmitted from the Intranet to Internet need to perform the above-mentioned operation procedure. Therefore, how to reduce the time for selecting a route is essential to the enhancement of the router's performance.

SUMMARY OF THE INVENTION

The objective of the present invention is to provide a router and a method for a router to transmit packets, which uses an NAT table with routing information to enhance the router's performance.

In order to achieve the above-mentioned objective and avoid the problems of the prior art, the present invention provides a method with two transmission modes for a router to transmit packets. According to the present invention, the router comprises a routing table and a network address translation table. The network address table comprises an internet routing field for recording an address where a routing path for transmitting a packet to a wide area network is stored, an intranet routing field for recording an address where a routing path for transmitting a packet to a local area network is stored, and a routing flag field for recording information indicating whether the network address translation table stores address where a routing path for transmitting a packet to the destination address is stored.

When receiving a packet to the destination address, the router checks whether the network address translation table records an address where a routing path to the destination address is stored. If the result is positive, the router transmits the packet according to the network address translation table. If the result is negative, the router will select a routing path to the destination address from the routing table and transmits the packet according to the routing path. Besides, the router will store the routing path selected from the routing table in the network address translation table, wherein the network address translation uses a structure pointer to store the address where the routing path is stored.

Compared with the prior art, the present invention can directly forward a packet to the next router through which the destination network is reachable according to the routing path stored in the NAT table. Since the NAT table stores the routing path, it is not necessary to select a routing path from the routing table, and the present invention can avoid the most time-consuming step for selecting routing path from the routing table. As a result, the performance of the router can be enhanced up to three times according to the present invention.

BRIEF DESCRIPTION OF THE DRAWINGS

Other objectives and advantages of the present invention will become apparent upon reading the following description and upon reference to the accompanying drawings in which.

Figure 10:
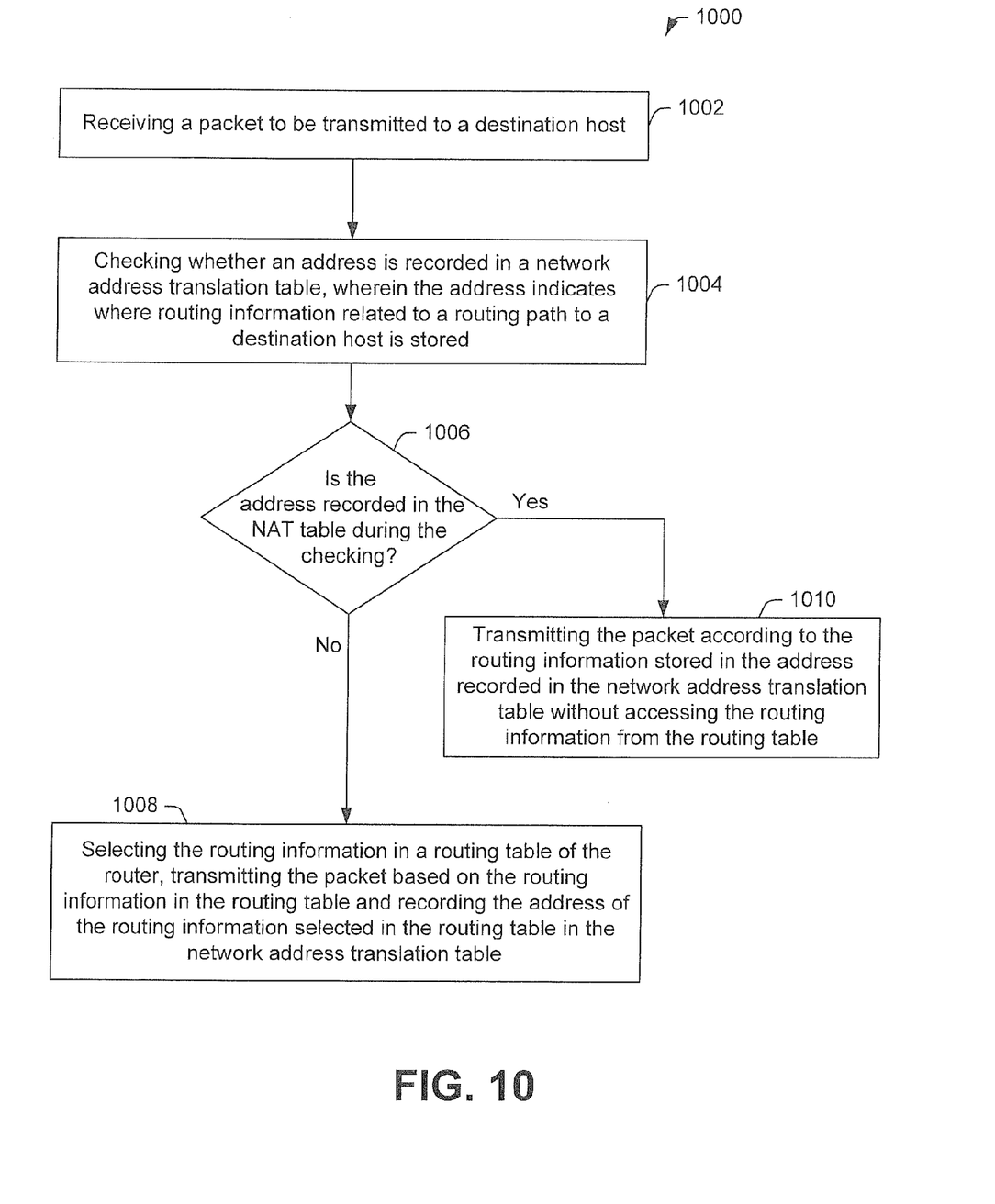

FIG. 10 is a flow chart of a method 1000 in accordance with some embodiments. At 1002, the method receives a packet to be transmitted to a destination host. At 1004, the method checks whether an address is recorded in a network address translation table, wherein the address indicates where routing information related to a routing path to a destination host is stored. At 1006, the method determines whether the address is recorded in the NAT table during the checking. If not ("NO" at 1006), the method proceeds to 1008 where it selects the routing information in a routing table of the router, transmits the packet based on the routing information in the routing table, and records the address of the routing information selected in the routing table in the network address translation table. If so ("YES" at 1006), the method proceeds to 1010 where it transmits the packet according to the routing information stored in the address recorded in the network address translation table without accessing the routing information from the routing table. It will be appreciated that the invention is not limited to any particular ordering for these or other blocks, and not all illustrated acts are required. For example, some acts may occur in different orders and/or concurrently with other acts or events apart from those illustrated and/or described herein. Further, one or more of the acts depicted herein may be carried out in one or more separate acts or phases.

DETAILED DESCRIPTION OF THE INVENTION

Figure 6:
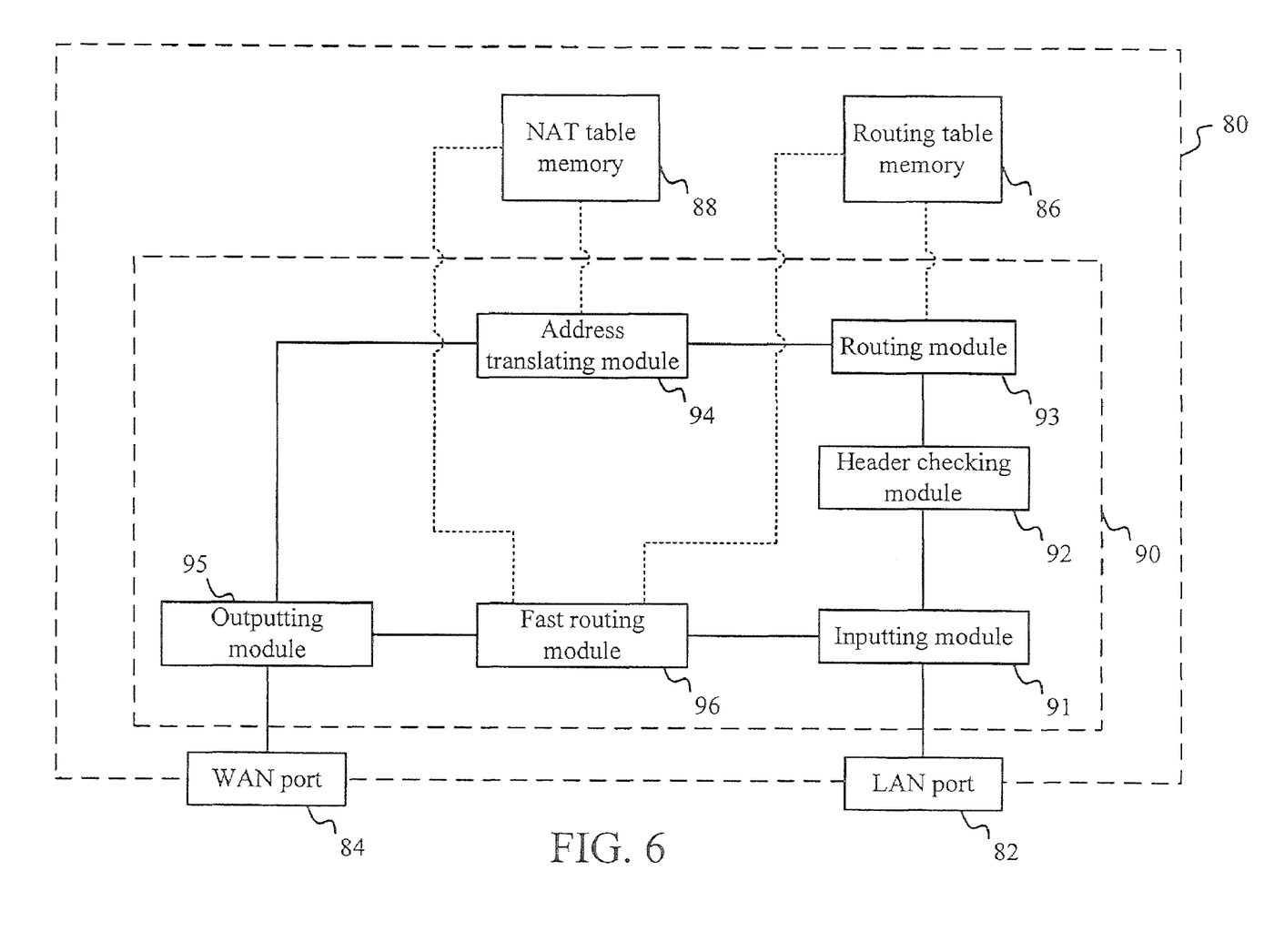
FIG. 6 is a functional block diagram of a router according to the present invention.

FIG. 6 is a functional block diagram of a router 80 according to the present invention. As shown in FIG. 6, the router 80 comprises an LAN port 82, a WAN port 84, a routing table memory 86, an NAT table memory 88 and a controller 90. The controller 90 comprises an inputting module 91, a header checking module 92, a routing module 93, an address translating module 94, an outputting module 95 and a fast routing module 96. When the router 80 receives a packet from the LAN port 82, the inputting module 91 checks whether the NAT table memory 88 records a fast routing path to the destination address of the packet. The packet is delivered to the fast routing module 96 if the result is positive, and to the header checking module 92 otherwise.

When receiving the packet, the fast routing module 96 changes the content of the header according to the routing information and the NAT information recorded in the NAT table memory 88, and then delivers the packet to the WAN via the output module 95 and the WAN port 84. On the other hand, the header checking module 92 checks whether or not to forward the packet, i.e., checks if the destination address of the packet is inside the same network domain as the router according the destination address recorded in the header of the packet. If the packet needs to be forwarded, the routing module 93 selects a routing path to the destination address from the routing table memory 86, the address translating module 94 changes the source address of the packet according the content of the NAT table memory 88, and the packet is then delivered to the WAN via the output module 95 and the WAN port 84.

Figure 7:
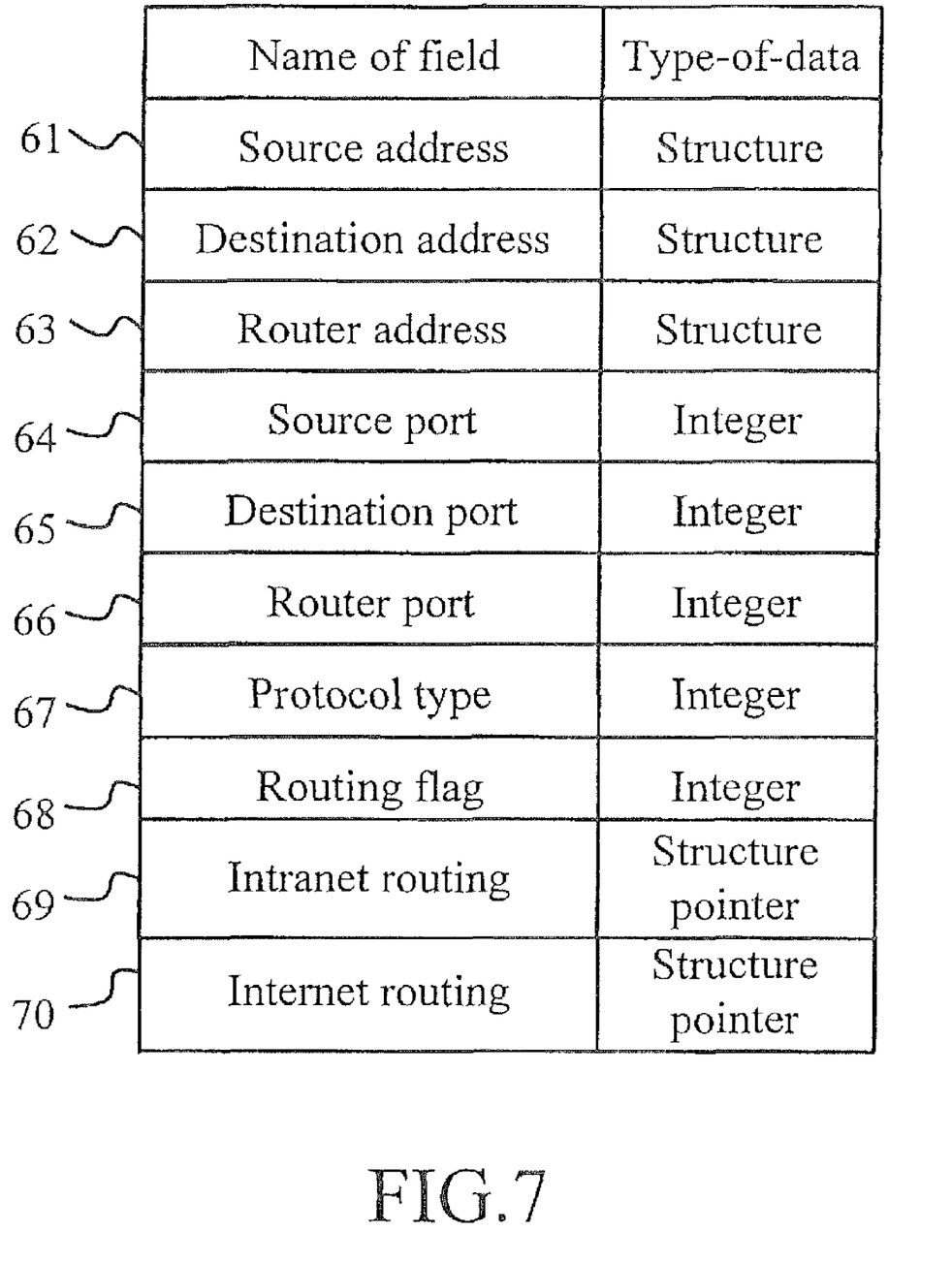
FIG. 7 illustrates some important fields of a network address translation table according to the present invention.

FIG. 7 shows some important fields of the NAT table according to the present invention. The source address field 61 is used to record the private address of a host in the network domain, the destination address field 62 is used to record a private address of a destination host, and the public address field 63 is used to record the public address of the router. When the router receives the packet, the source address recorded in the header of the packet is replaced by the content of the public address field 63 according to the correspondence between the source address and the destination address of the packet and that of the NAT table. According to the NAT technology, a remote host will regard the data transmission as being performed with the router, without concerning the real position of the host.

The NAT table of the present invention further comprises information for network address-port translation (NAPT). The source port field 64 is used to record the port of a host in the network domain, the destination port field 65 is used to record the port of a destination host, and the public port field 66 is used to record the public port of the router. The protocol identifier field 67 is used to record the protocol used to transmit the packet, such as the TCP or the UDP. Not only the address of the packet, but also the port of the packet are changed according to NAPT technology.

Figure 8:
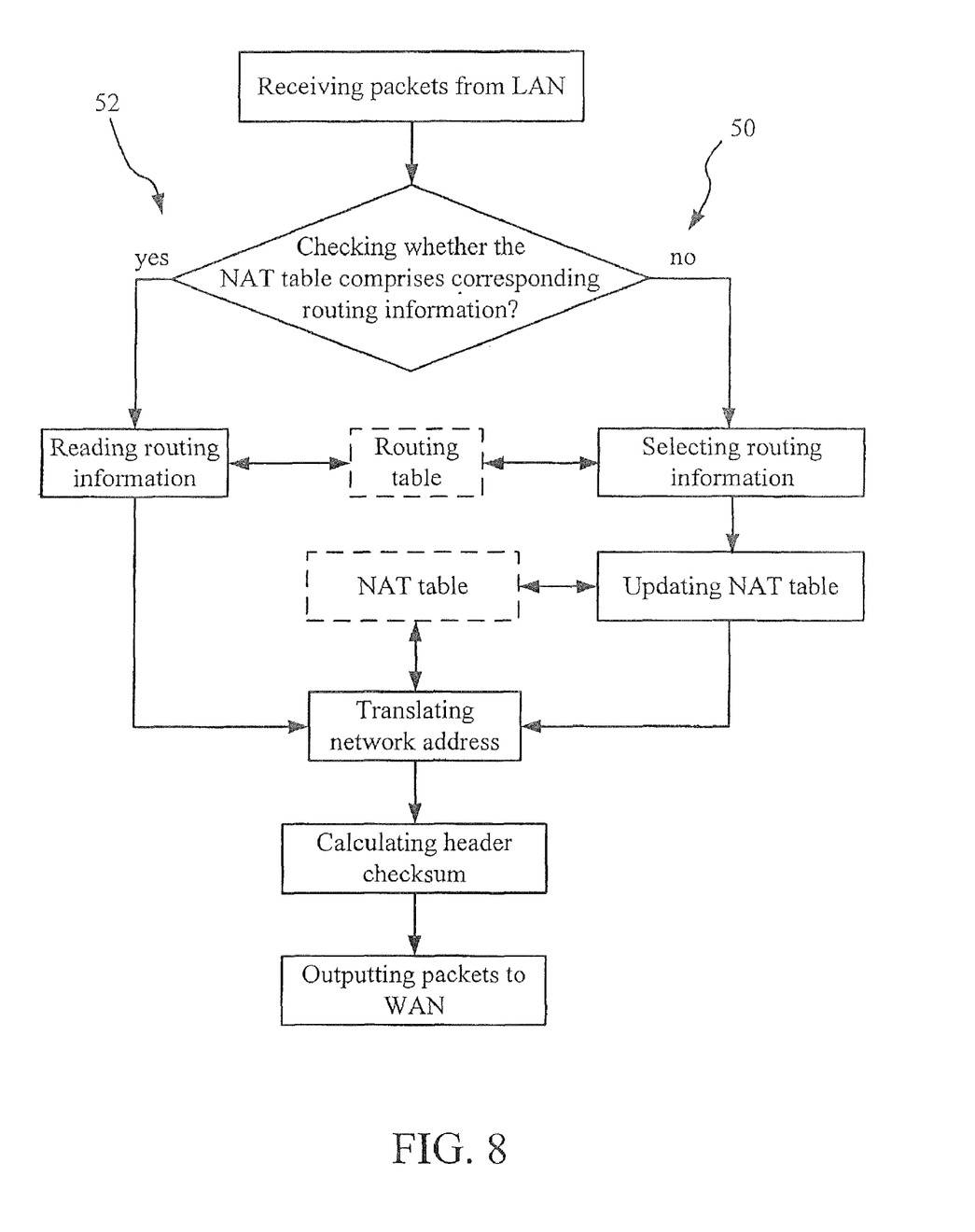
FIG. 8 is a flow chart showing the transmission of a packet conformed to the TCP/IP protocol according to the present invention.

The routing flag field 68 is used to record information indicating whether a packet can be transmitted from a source address to a destination address via a second path 52 shown in FIG. 8. The intranet routing field 69 is used to record routing information for transmitting packets to an LAN via the second path 52, and the internet routing field 70 is used to record routing information for transmitting packets to a WAN via the second path 52. The data stored in the intranet routing field 69 and the internet routing field 70 is a structure pointer pointing to the address where the routing path is stored. The NAT table of the present invention uses the structure pointer to record the address where the routing path is stored, rather than to store another routing path in the NAT table, which is the same as the routing table. Consequently, the present invention can save the content of the NAT table and avoid spending effort on maintaining two pieces of routing information.

FIG. 8 is a flow chart showing that the transmission of a packet conforms to the TCP/IP protocol according to the present invention, wherein the packet is transmitted from an LAN to a WAN. As shown in FIG. 8, there are two paths, the first path 50 and the second path 52, for transmitting the packet from the LAN to the WAN. When a router receives the packet from the LAN, it checks whether its NAT table records routing information to the destination address of the packet.

The packet will be transmitted via the second path 52 if the result is positive and via the first path 50 otherwise.

If the packet must be transmitted via the first path 50, i.e., the router forwards a packet from the source address to the destination address for the first time, the router must select from the routing table a routing path through which the destination address is reachable. After selecting the routing path, the router stores the routing information in internet routing field 70 and the return routing path in the intranet routing field 69 using the structure pointer, and sets the storing value of the routing flag field 68 to be one. Afterwards, the router replaces the source address recorded in the packet by the address recorded in the public address field 63 of the NAT table and replaces the source port recorded in the packet by the port stored in the public port field 66. Finally, the packet is transmitted to the WAN after recalculating the header checksum.

If the packet can be transmitted via the second path 52, i.e., the router has transmitted a packet from the source address to the destination address before, the router will directly read the routing path to the destination according to the structure pointer recorded in the internet routing field 70 of its NAT table. Afterwards, the router replaces the source address recorded in the packet by the address recorded in the public address field 63 of the NAT table and replaces the source port recorded in the packet by the port recorded in the public port field 66. Finally, after recalculating the header checksum, the router transmits the packet to the wide area network according to the routing path.

Figure 9:
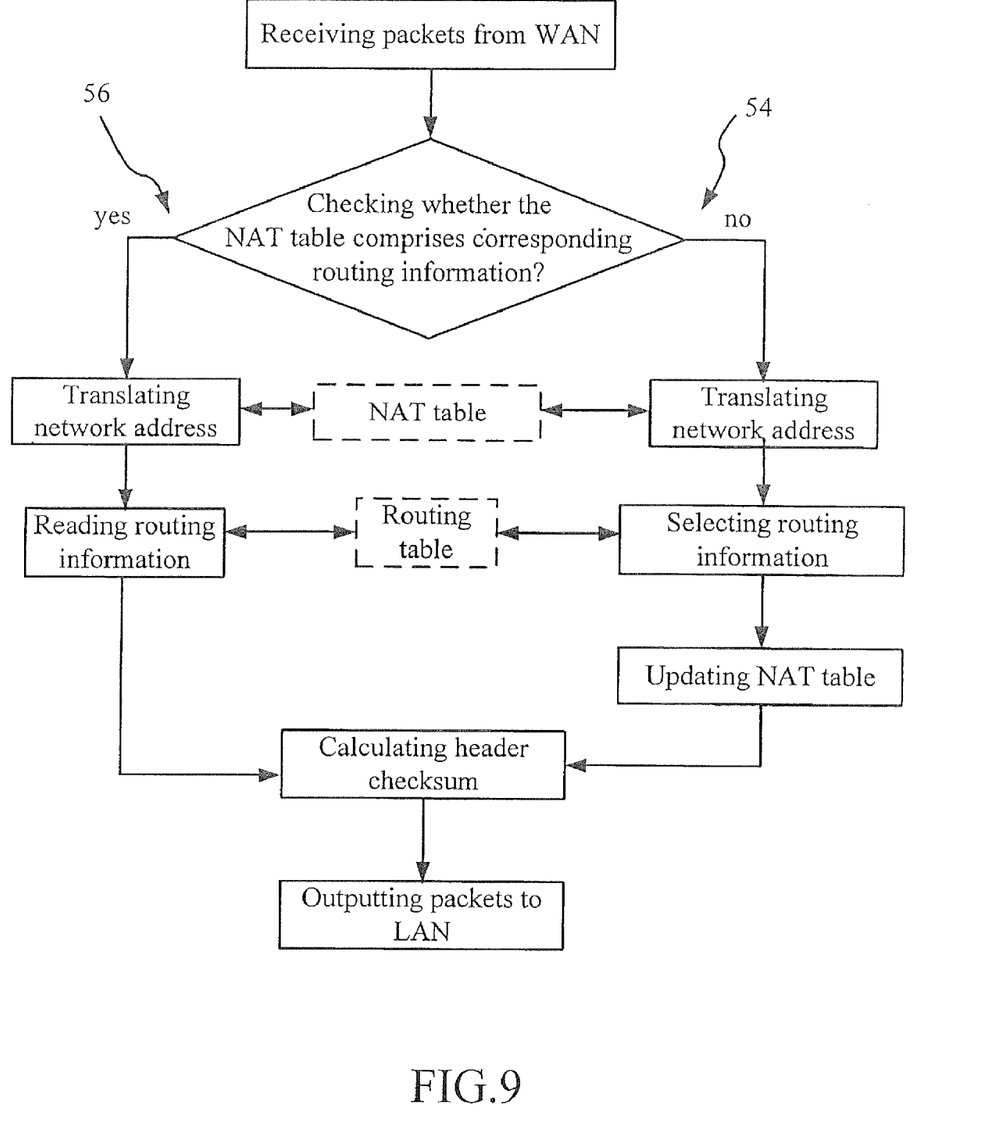
FIG. 9 is a flow chart showing the transmission of a packet conformed to the TCP/IP protocol according to the present invention.

FIG. 9 is a flow chart showing that the transmission of a packet conforms to the TCP/IP protocol according to the present invention, wherein the packet is transmitted from a WAN to an LAN. As shown in FIG. 8, there are two paths, the first path 54 and the second path 56, for transmitting the packet. When a router receives the packet from the WAN, it checks whether its NAT table records routing information to the destination address of the packet. The packet will be transmitted via the second path 56 if the result is positive and via the first path 54 otherwise.

If the packet must be transmitted via the first path 54, the router replaces the destination address recorded in the packet by the address recorded in the destination address field 62 and replaces the destination port recorded in the packet by the port recorded in the destination port field 65 of the NAT table. Afterwards, the router must select from the routing table a routing path through which the destination address is reachable. After selecting the routing path, the router stores the routing path in the intranet routing field 69 and the return routing path in the internet routing field 70 using the structure pointer, and sets the storing value of the routing flag field 68 to be one. Finally, the packet is transmitted to the LAN after recalculating the header checksum.

If the packet can be transmitted via the second path 56, the router replaces the destination address recorded in the packet by the address recorded in the destination address field 62 and replaces the destination port recorded in the packet by the port recorded in the destination port field 65 of the NAT table. Afterwards, the router will directly read the routing path to the destination according to the structure pointer recorded in the intranet routing field 69 of its NAT table. Finally, after recalculating the header checksum, the router transmits the packet to the LAN according to the routing path.

Compared with the prior art, the present invention can directly forward a packet to the next router through which the destination network is reachable according to the routing path stored in the NAT table. Since the NAT table stores the routing path, it is not necessary to select routing path from the routing table, and the present invention can avoid the most time-consuming step for selecting routing path from the routing table. As a result, the performance of the router can be enhanced up to three times according to the present invention.

The above-described embodiments of the present invention are intended to be illustrative only. Numerous alternative embodiments may be devised by those skilled in the art without departing from the scope of the following claims.

What is claimed is:

1. A method for a router to transmit packets, comprising:
   receiving at the router a packet to be transmitted to a destination host;
   determining whether a structure pointer associated with the packet is recorded in a network address translation table of the router, wherein the structure pointer points to an address where routing information for the received packet is stored in the routing table, and wherein the network address translation table further comprises information therein for network address-port translation and is a subset of a routing table of the router;
   if the structure pointer is not recorded in the network address translation table, selecting the routing information in the routing table of the router, transmitting the packet based on the routing information in the routing table and recording the address of the selected routing information in the routing table in the network address translation table; and
   if the structure pointer is recorded in the network address translation table, directly reading the routing information according to a structure pointer recorded in the network address translation table that is associated with the recorded address, and transmitting the packet based on the routing information to the destination host.

2. The method for a router to transmit packets of claim 1, further comprising:
   recalculating a header checksum of the packets before transmitting.

3. The method for a router to transmit packets of claim 1, wherein the network address translation table is configured to store a routing flag field for recording information indicating whether the network address translation table stores an address where a routing path for transmitting a packet to the destination address is stored.

4. The method for a router to transmit packets of claim 3, wherein the network address translation table is configured to store:
   an internet routing field for recording an address where a routing path for transmitting a packet to a wide area network is stored, and
   an intranet routing field for recording an address where a routing path for transmitting a packet to a local area network is stored.

5. A router comprising:
   a routing table configured to store routing information comprising a routing path to a destination host; and
   a network address translation table comprising one or more structure pointers recording one or more addresses indicating where the routing information comprising the routing path is stored in the routing table, the network address translation table further comprising information therein for network address-port translation and is a subset of a routing table of the router,
   wherein the router is configured to check whether a structure pointer associated with a received packet is present in the network address translation table of the router;
   wherein the router is further configured if the result of the checking is negative, to select the routing information from the routing table of the router, to transmit the packet based on the routing information from the routing table, and to record a structure pointer pointing to the address of the selected routing information of the routing table in the network address translation table; and wherein the router is further configured if the result of the checking is positive, to directly read the routing information from the routing table according to the structure pointer recording an address, and to transmit the packet based on the routing information.

6. The router of claim 5, wherein the network address translation table comprises an internet routing field and an intranet routing field, the internet routing field and the intranet routing field using a pointer to record the address of the routing path.

7. The router of claim 5, wherein the router is configured to select the routing information related to the routing path from the routing table for transmitting the packet from a local area network to a wide area network, and the address of the selected routing information is recorded in an internet routing field.

8. The router of claim 7, wherein the network address translation table further comprises:

a source address field for recording a private address of a host in a network domain;

a destination address field for recording a private address of a destination host; and a public address field for recording a public address of the router.

9. The router of claim 8, wherein the network address translation table further comprises:

a source port field for recording a port identifier of a host in a network domain;

a destination port field for recording a port identifier of a destination host; and a public port field for recording a public port identifier of the router.

10. The router of claim 9, wherein the network address translation table further comprises a protocol identifier field for recording protocol used to transmit the packet.

11. The router of claim 5, wherein the router is configured to select the routing information related to the routing path from the routing table for transmitting the packet from a wide area network to a local area network, and the address of the selected routing information related to the routing path is recorded in an intranet routing field.

* * * * *

UNITED STATES PATENT AND TRADEMARK OFFICE
CERTIFICATE OF CORRECTION

PATENT NO.        : 7,830,870 B2
APPLICATION NO.   : 10/652273
DATED             : November 9, 2010
INVENTOR(S)       : Kuo et al.

Page 1 of 1

It is certified that error appears in the above-identified patent and that said Letters Patent is hereby corrected as shown below:

On the front page; please show that the patent claims priority to provisional patent application number 60/439,937 filed January 14, 2003.

Signed and Sealed this
Fourteenth Day of June, 2011

David J. Kappos
*Director of the United States Patent and Trademark Office*